Nov. 23, 1937. G. K. McNEILL 2,100,084
PNEUMATIC TIRE TREAD
Filed Oct. 27, 1936
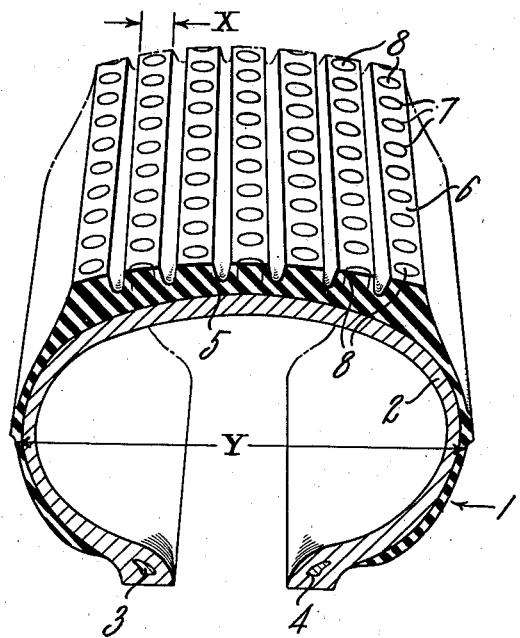
Fig. 1.
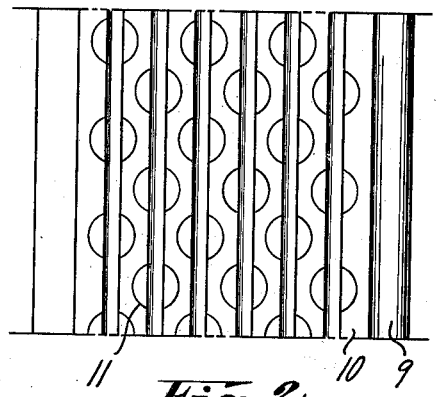
Fig. 2.
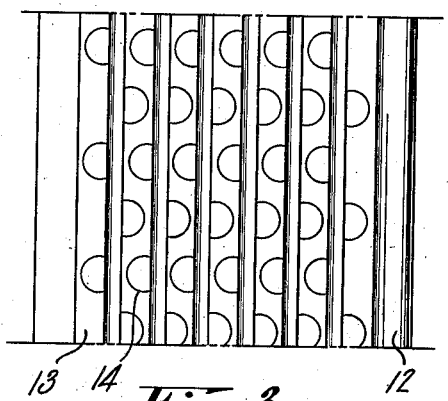
Fig. 3.
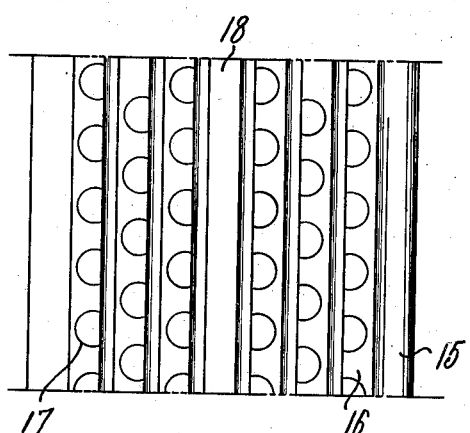
Fig. 4.
INVENTOR.
GEORGE K McNEILL
BY 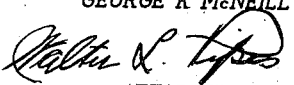
ATTORNEY.

Patented Nov. 23, 1937

2,100,084

UNITED STATES PATENT OFFICE 2,100,084

PNEUMATIC TIRE TREAD

George K. McNeill, Detroit, Mich., assignor to United States Rubber Products, Inc., New York, N. Y., a corporation of Delaware Application October 27, 1936, Serial No. 107,773

3 Claims. (Cl. 152—14)

This invention relates to pneumatic tires, and in particular it relates to pneumatic tire treads and to the structural formation of tire treads to increase the functional efficiency of the tires in operation.

In general, the invention relates to a pneumatic tire having a tread comprising a plurality of relatively narrow circumferential ribs, which have incorporated therein a plurality of slits or incisions in arcuate or curved formation extending inwardly from the road contacting surfaces of the ribs to substantially the bases of the ribs as defined by the grooves adjacent to the ribs.

In tires having treads with transverse slits for improving antiskid qualities there is a tendency for the bases of the slits to continue to extend deeper in the form of cracks. To overcome this condition a practice sometimes followed has been to slit the tread to a depth less than the height of the antiskid projections or ribs. To reduce cracking it has also been necessary to space the slits a substantial distance apart.

An object of this invention is to prevent cracking at the bases of the slits in slit tread tires.

Another object is to utilize slits of a depth substantially equal to the height of the antiskid elements.

A further object is to permit these slits to be spaced a less distance apart.

I obtain the foregoing and other objects and advantages, as hereinafter set forth, by providing arcuate slits in the tread ribs or projections. These slits may be extended to a complete circle without the removal of the circumscribed tread rubber. Thus, a tire of improved antiskid and wearing qualities is obtained.

The accompanying drawing illustrates certain present preferred embodiments of the invention, in which:

Fig. 1 is a transverse view, in section and in perspective, of a portion of a pneumatic tire incorporating an embodiment of the invention; and Figs. 2, 3, and 4 are plan views of portions of tires illustrating further modifications of the invention.

Referring to the drawing, and in particular to Fig. 1, I show a pneumatic tire 1 having a carcass 2 of strain resisting elements, inextensible bead elements 3 and 4, and a wear resistant tread 5. The anti-skid formation of the tread 5 comprises a plurality of circumferentially extending ribs 6 having slits 7 in circular outline cut therein.

While the features of this invention are applicable to treads having designs of various configurations, it is preferable to apply these slit formations to a tread design of plain, circumferential ribs. It is well known that a tread of a rib formation is relatively quiet in operation, and therefore is particularly adaptable for combination with the present method of tread treatment. Furthermore, it has been shown that a tread comprising circumferential ribs of a width within definite limitations shows a substantial improvement in antiskid qualities, particularly on wet road surfaces. Experiments have indicated that the minimum width of each rib 6 should not be less than 3 percent of the normal width of the tire in cross section, and that the maximum width of the rib should not exceed 8 percent of the normal width of the tire in cross section. In other words, dimension X as shown in Fig. 1, should be equal to from 3 to 8 percent of the dimensional character Y.

After the tire has been vulcanized with the desired tread formation, it is subjected to a slitting operation for producing the cuts or incisions 7 in the ribs in a substantially radial direction. As shown in Fig. 1, the slits 7 are cut into the ribs 6 in the form of circular incisions, resulting in the formation of cylindrical elements cut into the ribs 6 without the removal of substantially any of the rubber composition throughout the depth of the slit. These circular slits 7 are cut into the ribs 6 to a depth substantially equal to the height of the rib 6 representing the wearing portion of the tread. The circular slits are less in diameter than the width of the ribs, therefore the ribs operate as a supporting medium for the cylindrical elements 8.

When the tread of a tire has slits extending substantially in a straight line, the flexing of the tire in operation results in strains at the base of the slits, and it frequently occurs that the slits in the tread continue to extend deeper in the form of cracks. Such a condition is sometimes detrimental to the life of the tire. By providing the slits in the form of circular or arcuate incisions, the direction of the slits at their bases is continually changing and therefore the concentration of directional strains at such regions is not increased as a result of the slit formation.

The arcuate slits 7 may be formed in the tread by various methods. For example, a hot circular knife may be forced into the tread somewhat similar to a punching operation; or a hollow, rotary knife may be utilized to obtain the desired cut formation.

Fig. 2 illustrates a modification of the embodiment shown in Fig. 1, and comprises a tire 9 having ribs 10. In this modified form, circular incisions 11 are cut into the ribs of the tread in such manner that the centers of the circular incisions are substantially in the grooves between adjacent ribs. As a result of this operation, arcuate segments are formed in each of the ribs with complementary arcuate segments formed in the adjacent ribs. By this method of treating treads it is permissible to use circular incisions of greater diameter than is possible in the previously described embodiment.

As shown in the drawing, the preferred practice of cutting the slits is to provide a formation whereby the incisions on alternate sides of the ribs are staggered.

Fig. 3 illustrates a further modification, and shows a tire 12 having circumferentially extending ribs 13, and arcuate slits 14 formed in the ribs. These slits or incisions 14 are formed in the ribs 13 in such manner that the centers of the circular slits lie within the width of the ribs 13. In this method a single circular slit does not embrace more than a single rib. Similar to the modification shown in Fig. 2, the incisions form arcuate segments on alternate sides of each rib.

A still further modification is shown in Fig. 4 in which a tire 15 having a plurality of ribs 16 has slits in the form of arcuate segments 17. The centers of the circles forming the arcuate segments lie within the width of the ribs. As distinguished from the preceding modification, all of the segments 16 are located on one side of each rib only. In alternate ribs the slits may be in different positions in different ribs, and if preferred slits may be omitted from one or more of the ribs, such as rib 18.

While I have shown certain present preferred examples of my slitting formations, it is to be understood that the slits may be applied to certain of the ribs only, and that they may be positioned in various staggered relations and may be of various sizes, and that all of such modifications are contemplated within the invention except as limited by the scope of the appended claims.

Having thus described my invention, what I claim and desire to protect by Letters Patent is:—

1. A pneumatic tire comprising a carcass of strain resisting elements and a body of tread rubber composition, the road engaging portion of said tread composition being provided with grooves defining a plurality of circumferentially extending, functionally continuous ribs, said ribs being slit, without removal of substantially any of the rubber composition, into arcuate segments the chords of which lie in paths formed by the side walls of said ribs.

2. A pneumatic tire comprising a carcass of strain resisting elements and a body of tread rubber composition, the road engaging portion of said tread composition being provided with grooves defining a plurality of circumferentially extending, functionally continuous ribs, said ribs being slit, without the removal of substantially any of the rubber composition, into arcuate segments along the sides of at least some of the ribs and on alternate sides thereof, the chords of said segments lying in paths formed by the side walls of said ribs.

3. A pneumatic tire comprising a carcass of strain resisting elements and a body of tread rubber composition, the road engaging portion of said tread composition being provided with grooves defining a plurality of circumferentially extending, functionally continuous ribs, said ribs being slit, without the removal of substantially any of the rubber composition, into arcuate segments the chords of which lie in paths formed by the side walls of said ribs, the center of the circles forming each arcuate segment lying within the width of the rib in which the segment is formed.

GEORGE K. McNEILL.